United States Patent [11] 3,607,773

[72] Inventors Armin C. Pitchford;
 Gene N. Woodruff, both of Bartlesville, Okla.
[21] Appl. No. 762,991
[22] Filed Sept. 26, 1968
[45] Patented Sept. 21, 1971
[73] Assignee Phillips Petroleum Company

[54] EMULSIFYING WATER AND AIR-BLOWN ASPHALT WITH OIL AND TRIETHANDLAMINE
 7 Claims, No Drawings
[52] U.S. Cl. .................................................. 252/311.5, 106/277
[51] Int. Cl. ....................................................... B01j 13/00
[50] Field of Search ........................................... 252/311.5, 153, 154, 357, 351; 106/277 To.

[56] References Cited
 UNITED STATES PATENTS
2,040,115  5/1936  Watts ........................... 252/311.5
2,256,886  9/1941  Buckley ........................ 252/311.5
2,679,462  5/1954  Monson ........................ 106/123
2,793,138  5/1957  Wilkinson ..................... 106/123 TO
2,906,633  9/1959  Thomann ...................... 106/277

OTHER REFERENCES
 Chemical Abstracts Vol. 42, col. 4757b, Vol. 48 col. 11069d

Primary Examiner—John D. Welsh
Attorney—Young and Quigg

ABSTRACT: Airblown asphalt and water are hard to emulsify with either tall oil or triethanolamine as the emulsifying agent. The use of both tall oil and triethanolamine gives a synergistic effect, and weight percents based on the total weight of the emulsion of 0.9 tall oil and 0.7 triethanolamine produced stable emulsions while 1.6 of either one alone failed to produce an emulsion. Alkali metal hydroxide to adjust the pH above 7 and known emulsion stabilizing agents may be added.

EMULSIFYING WATER AND AIR-BLOWN ASPHALT WITH OIL AND TRIETHANDLAMINE

DISCLOSURE OF THE INVENTION

This invention is a process of emulsifying water and air-blown asphalt with a synergistic emulsifying agent comprising tall oil and triethanolamine, and a composition of matter produced thereby.

Airblown asphalt and water are hard to emulsify with either tall oil or triethanolamine as the emulsifying agent. The use of both tall oil and triethanolamine gives a synergistic effect, and weight percents based on the total weight of the emulsion of 0.9 tall oil and 0.7 triethanolamine produced stable emulsions while 1.6 of either one alone failed to produce an emulsion. Alkali metal hydroxide to adjust the pH above 7 and known emulsion stabilizing agents may be added.

In certain highly specialized applications it is often both desirable and necessary to apply high-melting asphaltic binders as coating materials at low temperatures to avoid deformation or melting of the matrix to which the asphalt is applied. This is especially true in the saturation of temperature sensitive polypropylene fabrics, such as those which are used in preparing impermeable linings for irrigation ditches, pond linings, and the like. Low temperature application is obtained by the use of an aqueous asphalt emulsion. However, this emulsification of airblown asphalts is very difficult.

In the prior art, when attempts were made to emulsify airblown asphalt and water, it has been difficult to form emulsions, even using excessively large amounts of emulsifying agents. It has now been unexpectedly discovered that when synergistic amounts of not less than 0.9 weight percent tall oil and 0.7 weight percent triethanolamine are used, a stable emulsion is formed.

In the practice of the present invention we prefer to employ Vinsol Resin (registered trademark of Hercules Powder Company), a hard, brittle, dark colored, thermoplastic resin derived from pine wood and containing phenol, aldehyde and ether groups. It has a specific gravity of 1.218, a melting point of 234°–239° F., a flash point of 455° F., and an acid No. 93, largely insoluble in petroleum solvents, but soluble in alcohols, ketones and esters. It is recommended for use in slow breaking types of asphalt emulsions by Hercules Powder Company. This Vinsol Resin is a form of tall oil, and the same amount of other tall oils can be substituted with similar useful results in the practice of this invention.

Tall oil is a liquid rosin, whereas Vinsol Resin is the same material in solid form. "Tall" is Swedish for "pine." Tall oil liquid rosin, Acintol C (trademark of Arizona Chemical Company), tallol, and talleol are all the same, being a byproduct of the wood pulp industry. Usually tall oil is recovered from pine wood "black liquor" of the sulfate or kraft paper process and contains rosin acids, oleic acid and linoleic acid. Long chain alcohols and small amounts of sterols, especially phytosterol, have also been found in it. It generally is a dark brown liquid having an acrid odor similar to that of burnt rosin. Its density is 0.95 to 1 and its $n_D^{20}$ is approximately 1.5. It has an acid No. 170–180, a saponification No. 172–185, and an iodine No. 120–188. It contains 50–60 percent fatty acids, 34–40 percent rosin acids, and 5–10 percent unsaponifiable material.

By tall oil we intend to cover the various tall oils, Vinsol Resin, and Acintol C.

We also employ enough alkali metal or ammonium hydroxide, preferably sodium hydroxide or potassium hydroxide, to change the acid pH caused by the Vinsol Resin to an alkaline pH above 7, preferably a pH from 10 to 12. This may be from 0.1 to 10 weight percent. Lithium, rubidium or cesium hydroxide are also operative.

We also may employ an emulsion stabilizer, but this is not essential. We can use any desired amount, such as 0.3 weight percent, of Indulin C (registered trademark of West Virginia Pulp & Paper Company), a sodium half salt of crude pine wood lignin, separated from paper pulp sulfate black liquor. It is a brown, free flowing, amorphous powder of small particle size, with a specific gravity of 1.3, a pH of 9.3, a fusion point of 200–250° C., and an apparent density of 25.9 lbs./ft.[3]. It contains 8.3 percent moisture, 19.1 percent ash, 11.5 percent methoxyl, and 0.8–1.5 percent sulfur. It is insoluble in dioxane and most other solvents and acids, is soluble in dilute alkaline solutions, and is dispersible in water. It is recommended for use as a stabilizer for asphalt emulsions by the West Virginia Pulp & Paper Company. However, we can make asphalt emulsions without it. They just will not be as stable. However, we can use other known emulsion stabilizers, such as 0.3 weight percent soya bean flour with equivalent results in the practice of this invention.

We also employ triethanolamine, formula $(HOC_2H_4)_3N$, and we can use either the pure chemical or a commercial impure grade known as Polyamine T NEW made by Union Carbide.

By airblown asphalt we intend to cover all substances known to the prior art as airblown asphalt, regardless of the original grade of asphalt or details of air blowing, as all of these will operate successfully in the invention. We prepared our airblown asphalt used in table 1 below from Kansas City 150/200 penetration base stock by air blowing for 3.5 hours at about 460° F. with air containing about 1.6 weight percent of $H_3PO_4$. The product had 43 penetration at 77° F. and 190° F. ring and ball test, and was fluxed with 14 percent of the original base stock to yield a material of 47 penetration and 169° F. ring and ball test. Even if it had 49 percent unairblown and 51 percent airblown asphalt, or up to 100 percent airblown asphalt, it would be operative and would be known as airblown asphalt.

There are many patents on air blowing asphalt, some with catalysts and some without. While any airblown asphalt is satisfactory for use in the present invention, the one we prepared above is preferred, along with those prepared according to Apellaniz 2,861,940 or Hoiberg 2,450,756.

Any water, such as tap water, river water, well water or rain water, may be used.

EXAMPLE

Airblown asphalt prepared as set forth above was combined with an aqueous solution of the other ingredients in a colloid mill. Any type could be used, but we used a Charlotte colloid mill. Any other type of beating the mixture can be substituted. The ingredients and amounts used in each of runs 1, 2 and 3 are shown in table 1 below. It will be noted that only in run 1 where both the Vinsol Resin and the $(HOC_2H_4)_3N$ (triethanolamine) was used was any emulsion formed. That was a stable dilatent emulsion. Dilatent means thickening upon stirring. Then the three runs were continued adding 5 weight percent water. No emulsion was formed in Runs 2 and 3, but the emulsion formed in run 1 was made nondilatent.

Table 1 shows all three runs as follows:

TABLE 1.—SOLUTIONS FOR EMULSIFYING ASPHALT

| | Composition, weight percent | | |
|---|---|---|---|
| Run No. | 1 | 2 | 3 |
| Materials: | | | |
| Tall oil | 0.9 | 1.6 | 0.0 |
| $(HOC_2H_4)_3N$ | 0.7 | 0.0 | 1.6 |
| Water | 33.5 | 33.9 | 34.0 |
| NaOH | 0.1 | 0.2 | 0.1 |
| Indulin C | 0.3 | 0.3 | 0.3 |
| Asphalt (air-blown) | 64.5 | 63.2 | 63.7 |
| Total | 100.0 | 99.2 | 99.7 |
| First result | (1) | (2) | (2) |
| Added material: Water | 5.0 | 5.0 | 5.0 |
| Second result | (3) | (2) | (2) |

[1] Stable dilatent emulsion.
[2] No emulsion.
[3] Stable nondilatent emulsion.

The amount of water can vary between 30 and 60 weight percent, preferably between 35 and 60 weight percent, and the amount of airblown asphalt can vary between 70 and 40 percent, preferably between 65 and 50 percent. The tall oil, which was Vinsol Resin, should be not less than 0.9 weight percent. The amount of triethanolamine, $(HOC_2H_4)_3N$, should be not less than 0.7 weight percent. The amount of alkali metal or ammonium hydroxide should be enough to raise the pH above 7, preferably to pH 10 to 12. The amount of Indulin C or other known asphalt emulsion stabilizer, like soya bean flour, may vary from zero to about 10 weight percent; and while emulsions can be formed without any stabilizer, it is preferred to add from 2 to 5 weight percent of any suitable emulsion stabilizer. All of the percents in this paragraph are weight percents and are based on the total weight of the emulsion produced.

When we claim an airblown asphalt aqueous emulsion consisting essentially of asphalt, water, tall oil and triethanolamine, we do not thereby exclude the other things anyone would normally add to such an emulsion if they desired, such as alkali metal hydroxide to adjust the pH, emulsion stabilizing agents such as soya bean flour, and other asphalt emulsion additives well known in the prior art and prior patents.

While a specific example has been given for illustrative purposes, the invention is not limited thereto.

We claim:

1. A process for preparing an airblown asphalt aqueous emulsion comprising the steps of combining an aqueous solution of tall oil and triethanolamine with airblown asphalt to form a mixture and agitating said mixture to thus form said emulsion wherein the total weight of said emulsion is comprised of 40 to 70 weight percent of said airblown asphalt, at least 0.9 weight percent of said tall oil and at least 0.7 weight percent of said triethanolamine.

2. The process of claim 1 wherein there is added to said aqueous solution an alkali metal hydroxide or ammonium hydroxide in an amount such that the pH of said emulsion is above 7.

3. The process of claim 2 wherein there is added to said aqueous solution a stabilizing agent selected from the group comprising Indulin C, as defined in the specification, and soya bean flour, wherein said agent is present in an amount up to 10 percent by weight of the total weight of said emulsion.

4. The product of the process of claim 1.

5. An aqueous emulsion consisting essentially of airblown asphalt, water, tall oil and triethanolamine wherein the total weight of said emulsion is comprised of 40 to 70 weight percent of said airblown asphalt, 60 to 30 weight percent of said water, at least 0.9 weight percent of said tall oil, and at least 0.7 weight percent of said triethanolamine; and further wherein said water is selected from tap water, river water, well water or rain water.

6. The emulsion of claim 5 containing in addition sufficient alkali metal hydroxide or ammonium hydroxide in an amount such that the pH of said emulsion is above 7.

7. The emulsion of claim 6 containing in addition a stabilizing agent selected from the group comprising a sodium half salt of crude pine wood lignin, and soya bean flour, wherein said agent is present in an amount up to 10 percent by weight of the total weight of said emulsion.